(No Model.) 5 Sheets—Sheet 1.
P. ARBEL.
METHOD OF MAKING CAR WHEELS AND DIES FOR SAME.
No. 501,908. Patented July 25, 1893.
*Fig. 1*
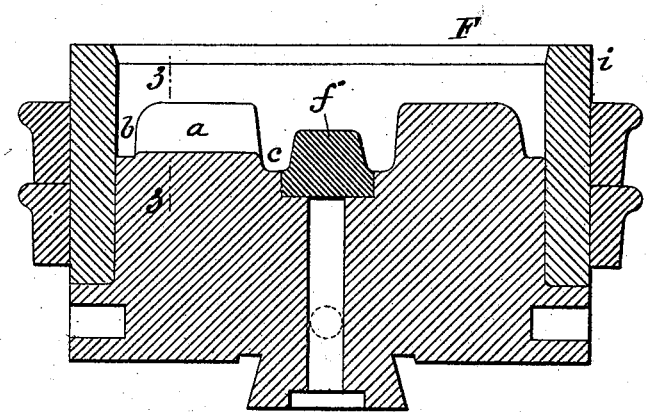
*Fig. 3*
*Fig. 2*
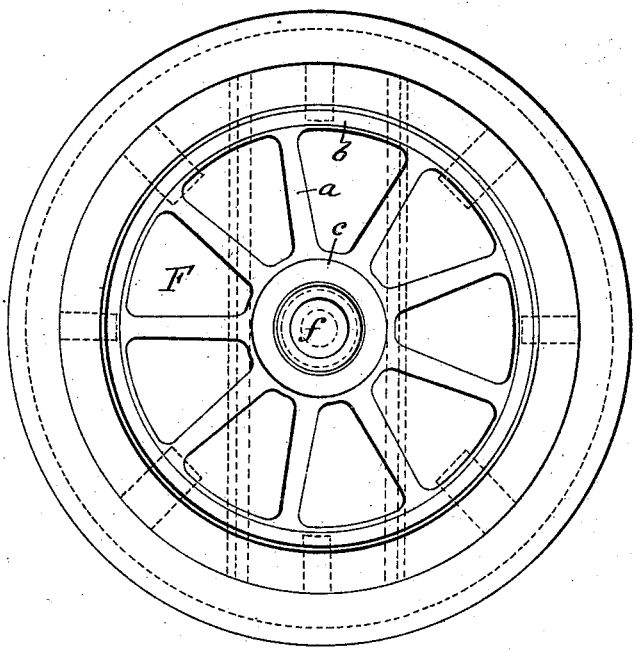
WITNESSES:
Fred White
C. K. Fraser.
INVENTOR:
Pierre Arbel,
By his Attorneys:
Arthur C. Fraser & Co.

(No Model.) 5 Sheets—Sheet 2.
P. ARBEL.
METHOD OF MAKING CAR WHEELS AND DIES FOR SAME.
No. 501,908. Patented July 25, 1893.

WITNESSES:
Fred White
C. K. Fraser.

INVENTOR:
Pierre Arbel,
By his Attorneys
Arthur C. Fraser &Co.

(No Model.) 5 Sheets—Sheet 3.
P. ARBEL.
METHOD OF MAKING CAR WHEELS AND DIES FOR SAME.
No. 501,908. Patented July 25, 1893.
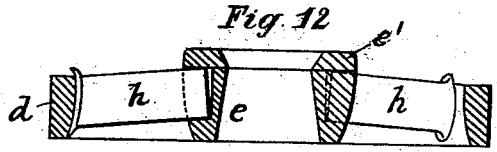
Fig. 12
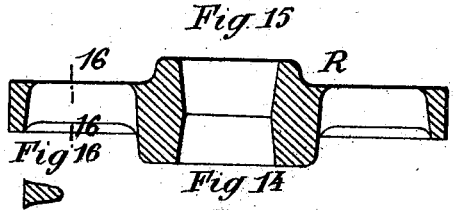
Fig. 15
Fig. 16
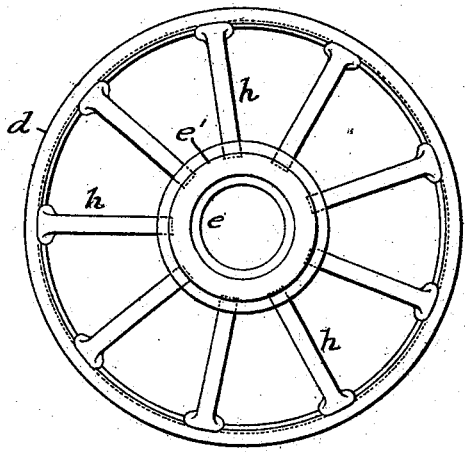
Fig. 13
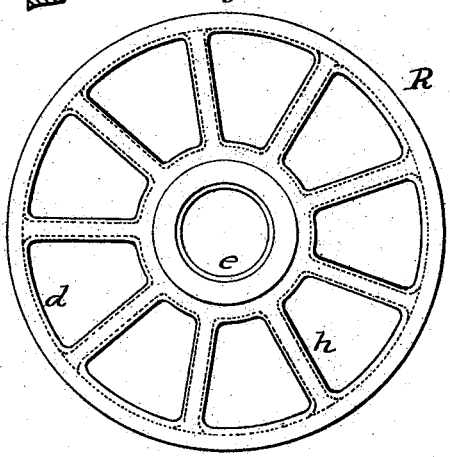
Fig. 14
Fig. 8   Fig. 6   Fig. 10
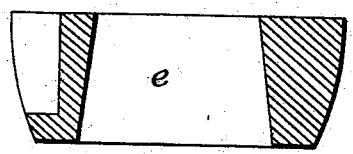
Fig. 9.
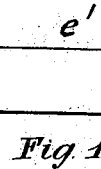
Fig. 11
Fig. 7
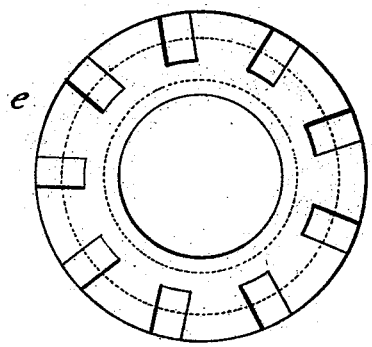
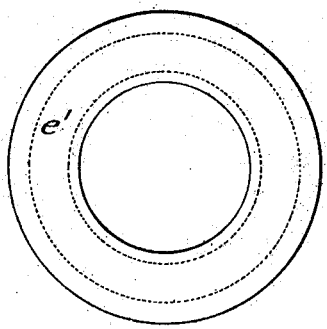
WITNESSES:
Fred White
C. K. Fraser
INVENTOR:
Pierre Arbel,
By his Attorneys,
Arthur E. Fraser & Co.

(No Model.)
P. ARBEL.
METHOD OF MAKING CAR WHEELS AND DIES FOR SAME.
No. 501,908. Patented July 25, 1893.
*Fig 17*
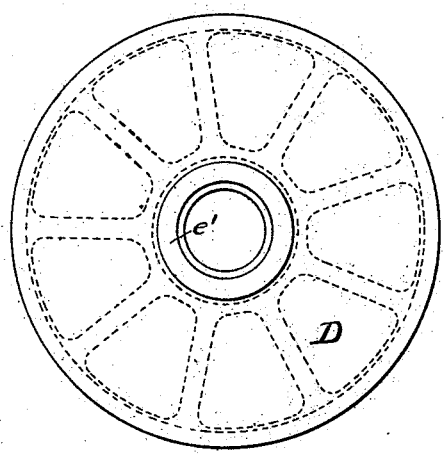
*Fig 22*
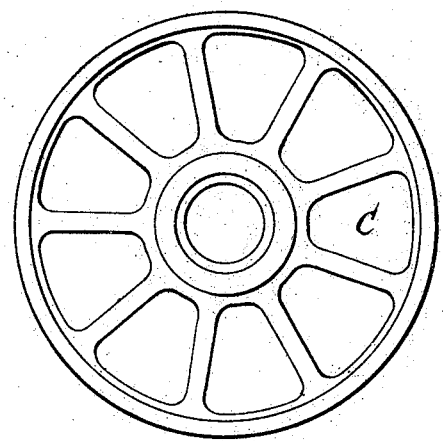
*Fig 18*
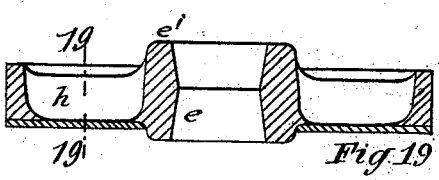
*Fig 21*
*Fig 20*
*Fig 23*
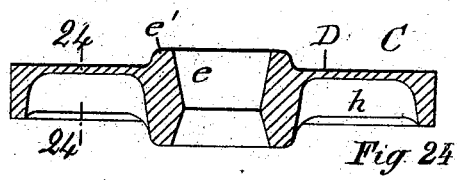
*Fig 24*
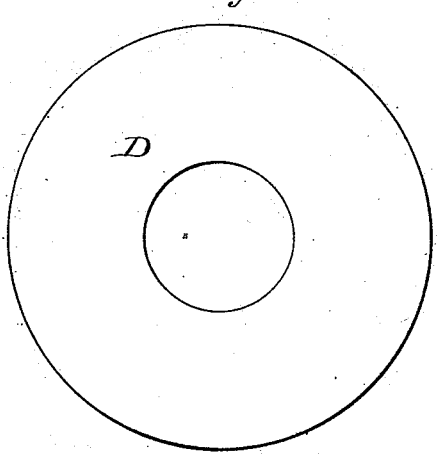
WITNESSES:
Fred White
C. K. Fraser
INVENTOR:
Pierre Arbel,
By his Attorneys
Arthur C. Fraser & Co.

(No Model.) 5 Sheets—Sheet 5.
P. ARBEL.
METHOD OF MAKING CAR WHEELS AND DIES FOR SAME.
No. 501,908. Patented July 25, 1893.
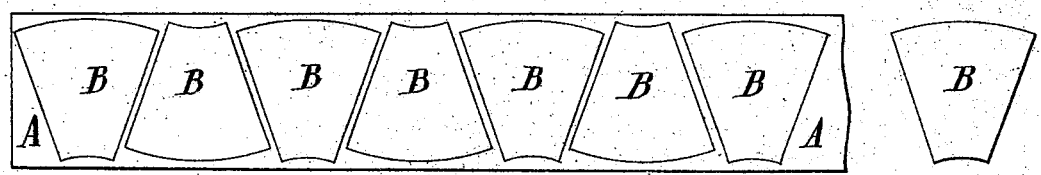
Fig. 25  Fig. 26
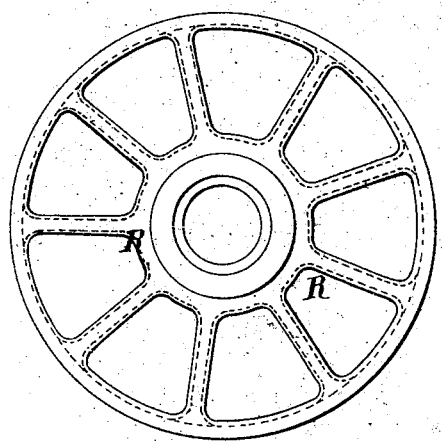
Fig. 27
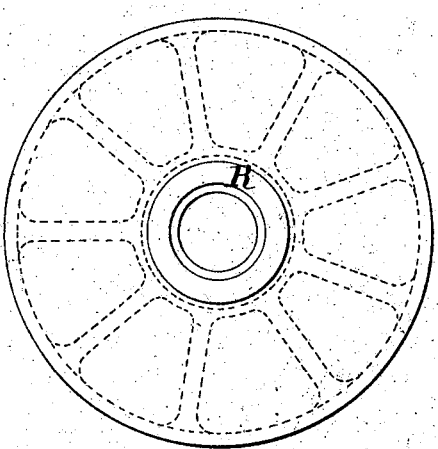
Fig. 31
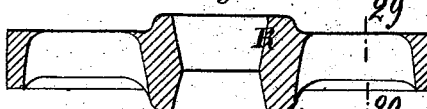
Fig. 30  Fig. 29
Fig. 28
Fig. 32  Fig. 33
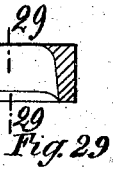
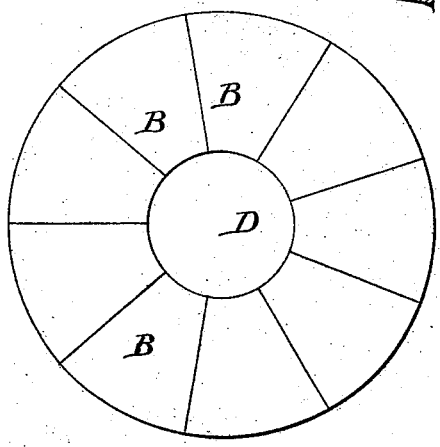
WITNESSES
Fred White
C. K. Fraser
INVENTOR:
Pierre Arbel,
By his Attorneys
Arthur C. Fraser & Co.

UNITED STATES PATENT OFFICE.

PIERRE ARBEL, OF PARIS, FRANCE, ASSIGNOR TO THE SOCIÉTÉ ANONYME INDUSTRIELLE DES ESTABLISHMENTS ARBEL, OF SAME PLACE.

METHOD OF MAKING CAR-WHEELS AND DIES FOR SAME.

SPECIFICATION forming part of Letters Patent No. 501,908, dated July 25, 1893.

Application filed April 12, 1893. Serial No. 470,071. (No model.) Patented in France February 11, 1891, No. 211,341.

*To all whom it may concern:*

Be it known that I, PIERRE ARBEL, a citizen of the Republic of France, residing in Paris, France, have invented certain new and useful Improvements in the Manufacture of Forged Car-Wheels, (which invention is the subject-matter of Letters Patent in France, No. 211,341, dated February 11, 1891,) of which the following is a specification.

This invention relates to the manufacture of metal railway and other wheels, and has for its object to render the work more rapid and easy and the tools more simple, also to economize material and labor. By the present improvements the manufacture of solid ribbed wheels is effected as will be described.

The principle of the manufacture is to forge in dies by the hammer or press a wheel having the spaces between ribs filled in with webs on the one side, thus producing a wheel which has the character of a wheel with spokes and also of a disk wheel, presenting the advantages of both.

Figure 4:
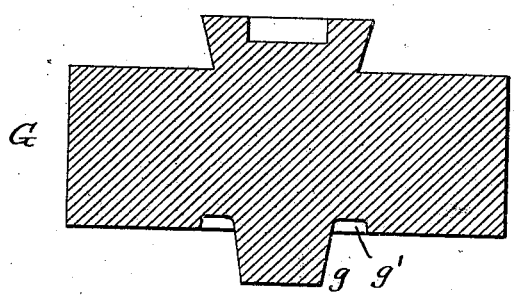
Figure 5:
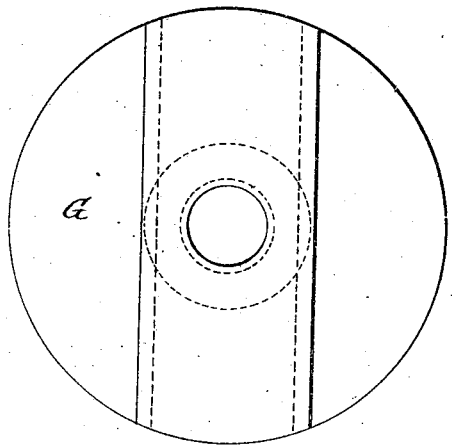

Figures 1 and 2 of the accompanying drawings are respectively a transverse mid-section and a plan of the lower or female die; and Fig. 3 is a fragmentary section on the line 3—3 in Fig. 1. Figs. 4 and 5 are respectively a transverse section and a plan of the upper or male die. Fig. 6 is a transverse section of the rolled bars for the spokes. Fig. 7 is a transverse section of the rim. Figs. 8 and 9 are respectively a transverse section and plan of a blank constituting the greater part of the nave or hub. Figs. 10 and 11 are respectively a transverse section and plan of a ring fagot constituting the remainder of the nave or hub. Figs. 12 and 13 are respectively a transverse section and plan showing the fagot or parts of the wheel put together ready for the first forging. Figs. 14 and 15 are respectively a plan and transverse section of the partly made wheel resulting from the first forging; Fig. 16 being the transverse section of one spoke on the line 16—16 in Fig. 15. Figs. 17 and 18 are respectively a plan and transverse section of the same partly made wheel with the addition of the disk web; Fig. 19 being a transverse section on the line 19—19 in Fig. 18. Figs. 20 and 21 are respectively a transverse section and plan of the disk web. Figs. 22 and 23 are respectively a plan and transverse section of the wheel resulting from the second forging; Fig. 24 being a transverse section on the line 24—24 in Fig. 23. Fig. 25 is a plan of a plate from which disk segments B B are cut; and Fig. 26 is a plan of one of these segments. Figs. 27 and 28 are respectively a plan and transverse section of a wheel after the first forging; Fig. 29 being a transverse section of one spoke on the line 29—29. Fig. 30 is a plan of the disk web built up of the segments B B. Figs. 31 and 32 are respectively a plan and transverse section of the partly finished wheel resulting from the second forging; and Fig. 33 is a transverse section of one spoke on the line 33—33 in Fig. 32.

Briefly stated the new method of manufacture consists in building up first a fagot for a spoke wheel as shown in Figs. 12 and 13, heating it and forging it between dies F and G, the former being shown in Figs. 1 and 2 and the latter in Figs. 4 and 5; then applying against the flat side of the partly made spoke wheel thus produced the heated disk D shown in Figs. 20 and 21 by placing the wheel in the die F and again forging to weld the disk securely to the rim, spokes and nave, whereby is produced a forged wheel having the character and advantages of both a spoke wheel and a disk wheel.

The following is the series of operations for the improved manufacture:

A. *Preparation of the fagot for the spoke-wheel.*—The rim $d$ consists of an iron bar, having the new section, Figs. 7 and 12, bent to the required diameter and welded. The nave consists first of a ring $e$ deeply recessed, Figs. 8 and 9, to receive the ends of the spokes and constituting almost the whole of the nave, and secondly of a ring $e'$ not recessed or simply a crude fagot (Figs. 10 and 11). The spokes $k\,k$ are of rolled iron bars cut to the desired length, of the section Fig. 6, a full V, which has the advantage of facilitating the withdrawal of the wheel from the dies after forging, owing to their considerable taper, and insuring a large surface for welding to the disk. The ends of the spokes which meet the rim are upset to provide metal for the welding as in the ordinary manufacture. The combination of the rim and spokes is effected as in the ordinary wrought iron wheels, Figs. 12 and 13.

B. *Heating.*—The whole is heated in the furnace to a white welding heat.

C. *Forging of the spoke-wheel.*—The heated wheel is seized by the pinchers and taken from the furnace to the stationary lower die, F, where it undergoes the pressure and repeated blows of an upper die G fixed to the striker of the hammer. These two dies which serve not only for forging the spoke wheel but also immediately after for welding the disk, differ essentially from each other in this that the lower die is so formed as to contain the whole of the forged spoke wheel and also the disk, while the upper die has a surface quite plain except an annular recess $g'$ at its center (Figs. 4, and 5) to produce an annular rib in the nave, Figs. 14 and 15. Further the lower die has a steel hoop $i$ projecting to form a guide for the upper die, Figs. 1 and 2. The guides which, in the manufacture of an ordinary wrought iron spoke wheel, are necessary to insure coincidence of the dies, are dispensed with, since the upper die has a plane face with no recesses for the spokes which are entirely contained in the lower die presenting only a plane surface where the dies meet each other. A few blows serve to weld the wheel completely which is then raised from the die in the known manner and held by the pinchers. The wheel then appears (Figs. 14 and 15) as a spoke wheel from which had been turned off one side of the spokes and rim so as to have them all in one plane with nothing but a small part of the nave projecting which serves to center and hold the disk in the second heating and forging.

D. *Welding of the disk.*—The disk D is of iron or weld-steel plate of desired thickness, Figs. 20 and 21, of the same diameter as the wheel with a central hole to fit the rib $e'$ of the nave mentioned above, Figs. 18 and 21. When the spoke wheel, still red hot in the lower die, is seized by the pinchers (without subjecting it to any preparatory work either scraping or turning) the disk is placed on it with its central hole engaging the rib $e'$ of the nave. Thus the heating remaining from the first forging is utilized. The whole (Figs. 17, 18 and 19, the latter being a section on the line 19—19 of Fig. 18) is taken to furnace, heated to white heat and replaced in the lower die. Care is taken to make some mark on the periphery of the rim before the reheating to indicate the exact place of one of the spokes so as to facilitate the introduction of the wheel with the disk on it into the lower die. The wheel being thus put in the lower die after heating, the disk is welded to the spokes, the rim and the nave, by the pressure and blows of the upper die which is the same as that employed for the first forging. It is to be observed that in this manufacture all the fins of the spoke wheel are utilized to aid in the welding of the disk, and far from being objectionable, they are of advantage to insure good final completion. The wheel thus forged and welded, Figs. 22, 23 and 24, is withdrawn from the die as before, is reheated and taken to be finished, which is much cheaper and simpler than for ordinary spoke wheels. Indeed all the finishing operations are dispensed with, as well as the expensive machines required for these, and scarcely any chipping is required. It is necessary only to turn the rim, the nave and the outer face of the disk to bring the work to the required dimensions.

If the disk is convenient and practical, it has the disadvantage, especially for wheels of large diameter, of being expensive on account of the width of the plate required and the waste incurred in cutting the plate to disk form. I therefore for large wheels intend to employ, instead of disk some segments B, Fig. 25, cut out of a wide plate A. These segments B, one of which is shown in Fig. 26, are placed on the forged spoke wheel R, Figs. 27 28 and 29, in such positions that all their edges are laid on the spokes, the rim and the nave. There is thus obtained a disk D (Fig. 30) consisting of elementary segments welded as above described with respect to the disk made in one piece, thereby producing a wheel finished as in the present case (Figs. 31, 32, and 33.)

The advantages of the described manufacture may thus be summarized:

A. In comparison with an ordinary wrought iron spoke wheel, the simplifying and suppressing of the various finishing operations, and consequent lessening of waste produced by the finishing machines and tools. Economy of labor, material and power. Simplification of plant since finishing machines are not needed.

B. In comparison with the old A. Arbel construction of disk wheel with ribs in form of arms in wrought iron.

1 and 2. Facility of withdrawal from the lower die by modifying the section of the spokes and nave. Certainty of welding the disk on the spokes, due to their form, on the nave by its being covered with crude iron in form of an annular rib on the outer side of the nave, Figs. 12, 15, 18 and 23.

3. Dispensing with turning of this rim and disk which is centered naturally by its middle hole, Fig. 18.

4. Suppression of the former first recessed upper die, the second upper die sufficing for the whole operation.

5. Suppression of the interruption in the process between the first forging of the spoke wheel, and the second necessary for welding the disk, these two operations continuing without stoppage, since the upper die has not been changed.

6. Suppression of the trimming.

7. Suppression of the complete cooling between the first and the second forging, rendered necessary by having to trim, to turn the rim and to change the die. Consequent possibility of utilizing the heat remaining in the wheel after the first forging and hence economy of fuel and increase of output.

8. Simplification of plant, in respect of dies of which two suffice instead of the three formerly required and also in respect of machines and tools employed in trimming and turning.

9. Economy of material and labor as aforesaid.

I claim as my invention the following-defined novel features or improvements substantially as hereinbefore set forth, namely:—

1. The process of making a forged wheel consisting in first building up a fagot of the rim, nave and spokes, second, heating this and forging it between dies to produce a spoke wheel, third, applying a heated disk on one side thereof, and fourth, welding this disk to the spokes, rim and nave, whereby is produced an integral forged wheel having spokes and web.

2. The process of making a forged wheel consisting in first building up a fagot of rim, nave and spokes, the latter being made wedge-shaped in cross-section with their broader flat sides in the same plane as the side of the rim, and the nave having a projection $e'$ beyond this plane, second, heating this fagot and forging it between dies to form a spoke wheel, third, placing against the flat side thereof a heated disk having a central hole fitting over said nave projection, and fourth, welding this disk to the spoke wheel between dies.

3. The process of making a forged wheel consisting in first building up a fagot of rim, nave and spokes, second, heating this and forging it between dies to produce a spoke wheel, third, applying to one side of said wheel while still at welding heat a heated disk, and fourth, welding this disk to the wheel between dies, whereby the complete wheel is made at one heat.

4. The improved dies for forging the combined spoke and web wheel described, consisting of a lower die F having recesses $a$ $b$ and $c$ for receiving the entire thickness of the rim and spokes, and of the nave excepting a projecting portion $e'$ thereof, combined with the upper die G having a plane or unrecessed lower face except for the recess $g'$ for receiving said projecting portion $e'$ of the nave, whereby the same dies are adapted for first forging the spoke wheel and subsequently welding a disk thereto to form the web.

In witness whereof I have hereunto signed my name in the presence of two subscribing witnesses.

PIERRE ARBEL.

Witnesses:
 ROBT. M. HOOPER,
 AUGUST MATHIEU.